(12) United States Patent
Novikoff

(10) Patent No.: US 9,881,645 B2
(45) Date of Patent: Jan. 30, 2018

(54) SYSTEMS, METHODS, AND MEDIA FOR EDITING VIDEO DURING PLAYBACK VIA GESTURES

(71) Applicant: Google Inc., Mountain View, CA (US)

(72) Inventor: Timothy Priestley Novikoff, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 733 days.

(21) Appl. No.: 14/463,940

(22) Filed: Aug. 20, 2014

(65) Prior Publication Data

US 2015/0058733 A1 Feb. 26, 2015

Related U.S. Application Data

(60) Provisional application No. 61/867,887, filed on Aug. 20, 2013.

(51) Int. Cl.
*G06F 3/048* (2013.01)
*G11B 27/031* (2006.01)
*G11B 27/038* (2006.01)
*G11B 27/34* (2006.01)

(52) U.S. Cl.
CPC .......... *G11B 27/031* (2013.01); *G11B 27/038* (2013.01); *G11B 27/34* (2013.01)

(58) Field of Classification Search
CPC ............. G06F 3/04883; G06F 3/04842; G06F 3/0488; G06F 3/0482; G06F 3/0485; G06F 3/04886; G11B 27/034; G11B 27/34; G11B 27/10; G11B 27/105
See application file for complete search history.

(56) References Cited

U.S. PATENT DOCUMENTS

| | | | | |
|---|---|---|---|---|
| 8,291,350 B1* | 10/2012 | Park | ............ | G06F 3/04883 715/705 |
| 8,448,083 B1* | 5/2013 | Migos | ............ | G06F 3/04883 345/671 |
| 8,477,139 B2* | 7/2013 | Robinet | ............ | G06F 3/04815 345/419 |
| 8,620,146 B1* | 12/2013 | Coleman | ............ | H04N 5/765 386/223 |
| RE44,743 E | 2/2014 | Topiwala | | |
| 8,745,500 B1* | 6/2014 | Kostello | ............ | G11B 27/34 386/282 |
| 9,197,730 B2* | 11/2015 | Baek | ............ | G06F 3/0488 |
| 9,390,752 B1* | 7/2016 | McNeill | ............ | G11B 27/031 |
| 2008/0165141 A1* | 7/2008 | Christie | ............ | G06F 3/044 345/173 |
| 2008/0298571 A1* | 12/2008 | Kurtz | ............ | H04N 7/142 379/156 |
| 2009/0002335 A1* | 1/2009 | Chaudhri | ............ | G06F 3/04815 345/173 |

(Continued)

FOREIGN PATENT DOCUMENTS

EP 1942401 7/2008

*Primary Examiner* — Linh K Pham
(74) *Attorney, Agent, or Firm* — IP Spring

(57) ABSTRACT

Described are computer-based systems, computer-implemented methods, and non-transitory computer-readable media for editing video in real-time, or substantially in real-time, using gestures to apply transitions and effects to a plurality of simultaneously played video sources to create an edited video output.

17 Claims, 21 Drawing Sheets

(56) References Cited

U.S. PATENT DOCUMENTS

| | | | |
|---|---|---|---|
| 2009/0174677 A1* | 7/2009 | Gehani | G06F 3/04847 345/173 |
| 2009/0303231 A1* | 12/2009 | Robinet | G06F 3/04815 345/419 |
| 2010/0281383 A1* | 11/2010 | Meaney | G11B 27/031 715/723 |
| 2011/0261213 A1* | 10/2011 | Rottler | G06F 3/04883 348/211.6 |
| 2012/0182226 A1* | 7/2012 | Tuli | G06F 3/04883 345/173 |
| 2012/0208466 A1* | 8/2012 | Park | G06F 1/1601 455/41.3 |
| 2012/0210230 A1* | 8/2012 | Matsuda | G11B 27/034 715/723 |
| 2012/0262462 A1* | 10/2012 | Montan | G06T 13/80 345/473 |
| 2012/0306786 A1* | 12/2012 | Bang | G06F 3/04883 345/173 |
| 2013/0033483 A1* | 2/2013 | Im | G06F 3/017 345/419 |
| 2013/0073960 A1* | 3/2013 | Eppolito | G11B 27/034 715/716 |
| 2013/0125000 A1* | 5/2013 | Fleischhauer | G11B 27/031 715/723 |
| 2013/0174039 A1* | 7/2013 | Lee | G06F 17/30852 715/723 |
| 2013/0191757 A1* | 7/2013 | Smith | G06F 3/0488 715/748 |
| 2013/0222263 A1* | 8/2013 | Shah | G06F 3/0488 345/173 |
| 2013/0236093 A1* | 9/2013 | Gatt | G06F 3/0484 382/167 |
| 2013/0257770 A1* | 10/2013 | Tsaregorodtsev | G06F 3/0488 345/173 |
| 2013/0259447 A1* | 10/2013 | Sathish | H04N 9/87 386/278 |
| 2013/0311886 A1* | 11/2013 | Ku | G06F 3/0484 715/719 |
| 2013/0343729 A1* | 12/2013 | Rav-Acha | G11B 27/28 386/285 |
| 2014/0267749 A1* | 9/2014 | Frigon | H04N 1/00244 348/159 |
| 2015/0256763 A1* | 9/2015 | Niemi | G06F 3/0485 348/700 |

* cited by examiner

TAP TO RECORD

SYSTEMS, METHODS, AND MEDIA FOR EDITING VIDEO DURING PLAYBACK VIA GESTURES

CROSS REFERENCE TO RELATED APPLICATIONS

This application claims the benefit of U.S. Application Ser. No. 61/867,887, filed Aug. 20, 2013, which is hereby incorporated by reference in its entirety.

BACKGROUND OF THE INVENTION

The popularity of online video is well documented. According to ComScore, in April 2013, over 180 million Americans watched more than 38 billion online content videos. By way of further example, more than 1 billion unique users visit YouTube each month, spending more than 4 billion hours watching videos. Increasingly, viewers enjoy video on their mobile devices. In fact, ComScore also reports that almost 40 percent of time spent online is on a mobile device.

SUMMARY OF THE INVENTION

Traditional video editing software exists for desktop computing devices and increasingly for mobile devices. Some existing software packages allow users to make videos that incorporate transitions seen in television and movies, such as dissolve transitions (sometimes referred to as a "crossfade"), or wipe transitions and have features allowing the user to incorporate multiple videos into an edited video output.

However, despite the proliferation of touch screen and gesture-sensitive mobile devices, there have not been any applications that allow the user to incorporate video transitions "on the fly," while videos play back in real-time or substantially in real-time. Even more precisely, there have not been any applications using gestures over multiple playing source videos ("Cameras," as in "cut to Camera 3!") to trigger transitions in a preview of the final edited video that is created in real-time, or something close to real-time, alongside the multiple source videos. Currently, there has been a complete lack of software that uses gestures for on-the-fly editing to provide the transitions that amateur and professional video editors seek. Described herein is multi-cam editing software for gesture-sensitive and multi-touch devices that overcomes these deficiencies of the current solutions.

The advantages of the systems, methods, and media described include, but are not limited to, allowing users to create videos with desired transitions between multiple source videos, seeing a preview of their final video in real-time (or substantially in real-time) as they create it, and using an interface that differs from other software that allow transitions in at least that it is less reliant on buttons, sliders, and other graphical elements, relying instead on gestures.

In one aspect, disclosed herein are non-transitory computer-readable storage media encoded with a computer program including instructions executable by a processor to create a gestural video editing application comprising: a software module configured to present a plurality of video sources, the video sources played simultaneously in a live video editing session; a software module configured to receive gesture input from a user in the video editing session, the gesture input indicating one or more of the video sources, the gesture input indicating one or more transitions, effects, or configurations to apply to the indicated video sources; and a software module configured to present a video output, the video output generated by editing one or more of the video sources in the video editing session, the editing comprising applying the indicated transitions, effects, or configurations to the indicated video sources. In some embodiments, the software module configured to present a plurality of video sources presents 2 to 10 video sources. In some embodiments, the software module configured to present a plurality of video sources presents about 4 video sources. In some embodiments, the software module configured to present a video output applies the one or more transitions, effects, or configurations to the indicated video sources in real-time, or substantially in real-time, during playback of the video output. In some embodiments, the gesture input is a touch screen or multi-touch screen gesture. In further embodiments, the gesture input comprises a one-finger tap, the tap on a video source, wherein the one-finger tap indicates a cut transition to the tapped source, the cut transition for the visual content only. In further embodiments, the gesture input comprises a two-finger tap, the tap on a video source, wherein the two-finger tap indicates a cut transition to the tapped source, the cut transition for the visual and audio content. In further embodiments, the gesture input comprises a one-finger swipe (a "swipe" is optionally called a "pan"), the swipe starting on a first video source, the swipe ending on a second video source, wherein the one-finger swipe indicates a dissolve transition from the first video source to the second video source. In further embodiments, the gesture input comprises a one-finger swipe, the swipe ending on a target video source, wherein the one-finger swipe indicates a dissolve transition from the video source currently providing content for the video output to the target video source. In further embodiments, the gesture input comprises a multi-finger tap, each finger tapping a distinct video source, wherein the multi-finger tap indicates a transition to a split screen configuration displaying each tapped video source. In further embodiments, the gesture input comprises a multi-finger tap, one finger tapping a first video source, two fingers tapping a second video source, wherein the multi-finger tap indicates a transition to a picture-in-picture configuration with the second video source set inside the first video source or with the first video source inset inside the second video source. In further embodiments, the gesture input comprises a four-finger tap, the tap on a video source, wherein the four-finger tap indicates a special transition to the tapped video source, such as a dreamy transition. In further embodiments, the gesture input comprises a two-finger swipe, the swipe starting on a first video source, the swipe ending on a second video source, wherein the two-finger swipe indicates a wipe transition from the first video source to the second video source. In further embodiments, the gesture input comprises a two-finger swipe, the swipe ending on a target video source, wherein the two-finger swipe indicates a wipe transition from the video source currently providing content for the video output to the target video source. In further embodiments, the gesture input comprises a five-finger gesture, the fingers moving away from each other (e.g., reverse pinch), the gesture performed on a target video source, the five-fingered gesture indicating a star wipe transition from the video source currently providing content for the video output to the target video source. In some embodiments, the software module configured to receive gesture input from a user receives the speed of the gesture, the speed used to configure the characteristics of the one or more transitions, effects, or configurations. In further embodiments, the speed of the gesture is used to configure the speed of an indicated transition. In some embodiments, the software module configured to receive gesture input from a user receives the length of the gesture, the length used to configure a characteristic of the one or more transitions, effects, or configurations. In further embodiments, the length of the gesture is used to configure the speed of an indicated transition. In some embodiments, the software module configured to receive gesture input from a user receives the duration of the gesture, the duration used to configure a characteristic of the one or more transitions, effects, or configurations. In further embodiments, the duration of the gesture is used to configure the speed of an indicated transition. In still further embodiments, the speed of the gesture, length of the gesture, duration of the gesture, or a combination thereof is used to configure one or more characteristics of an indicated transition. In some embodiments, the application further comprises a software module configured to present a graphic representation of the video output, the graphic representation comprising an icon representing each edit, each icon indicating a type of edit and one or more video sources used in the edit. In some embodiments, the application further comprises a software module configured to present a graphic representation of the video output, the graphic representation comprising an icon representing each temporal segment of the video output, each icon indicating a type of edit and the number of video sources incorporated in that segment of the video output. In some embodiments, the application further comprises a software module configured to share the video output to a social media forum. In some embodiments, the gesture input from the user is the sole input for the video editing. In some embodiments, the application is a mobile application.

In another aspect, disclosed herein are computer-implemented gestural video editing systems comprising: a digital processing device comprising an operating system configured to perform executable instructions and a memory device; a computer program including instructions executable by the digital processing device to create a gestural video editing application comprising: a software module configured to present a plurality of video sources, the video sources played simultaneously in a live video editing session; a software module configured to receive gesture input from a user in the video editing session, the gesture input indicating one or more of the video sources, the gesture input indicating one or more transitions, effects, or configurations to apply to the indicated video sources; and a software module configured to present a video output, the video output generated by editing one or more of the video sources in the video editing session, the editing comprising applying the indicated transitions, effects, or configurations to the indicated video sources. In some embodiments, the software module configured to present a plurality of video sources presents 2 to 10 video sources. In some embodiments, the software module configured to present a plurality of video sources presents about 4 video sources. In some embodiments, the software module configured to present a video output applies the one or more transitions, effects, or configurations to the indicated video sources in real-time, or substantially in real-time, during playback of the video output. In some embodiments, the gesture input is a touch screen or multi-touch screen gesture. In further embodiments, the gesture input comprises a one-finger tap, the tap on a video source, wherein the one-finger tap indicates a cut transition to the tapped source, the cut transition for the visual content only. In further embodiments, the gesture input comprises a two-finger tap, the tap on a video source, wherein the two-finger tap indicates a cut transition to the tapped source, the cut transition for the visual and audio content. In further embodiments, the gesture input comprises a one-finger swipe, the swipe starting on a first video source, the swipe ending on a second video source, wherein the one-finger swipe indicates a dissolve transition from the first video source to the second video source. In further embodiments, the gesture input comprises a one-finger swipe, the swipe ending on a target video source, wherein the one-finger swipe indicates a dissolve transition from the video source currently providing content for the video output to the target video source. In further embodiments, the gesture input comprises a multi-finger tap, each finger tapping a distinct video source, wherein the multi-finger tap indicates a split screen transition displaying each tapped video source. In further embodiments, the gesture input comprises a multi-finger tap, one finger tapping a first video source, two fingers tapping a second video source, wherein the multi-finger tap indicates a picture-in-picture configuration with the second video source set inside the first video source or with the first video source inset inside the second video source. In further embodiments, the gesture input comprises a four-finger tap, the tap on a video source, wherein the four-finger tap indicates a dreamy transition to the tapped video source. In further embodiments, the gesture input comprises a back-and-forth scratching motion with multiple fingers, the scratching motion on a video source, wherein the scratching motion indicates a dreamy transition to the video source. In further embodiments, the gesture input comprises a two-finger swipe, the swipe starting on a first video source, the swipe ending on a second video source, wherein the two-finger swipe indicates a wipe transition from the first video source to the second video source. In further embodiments, the gesture input comprises a two-finger swipe, the swipe ending on a target video source, wherein the two-finger swipe indicates a wipe transition from the video source currently providing content for the video output to the target video source. In further embodiments, the gesture input comprises a five-finger gesture, the fingers moving away from each other (e.g., reverse pinch), the gesture performed on a target video source, the five-fingered gesture indicating a star wipe transition from the video source currently providing content for the video output to the target video source. In some embodiments, the software module configured to receive gesture input from a user receives the speed of the gesture, the speed used to configure the characteristics of the one or more transitions, effects, or configurations. In further embodiments, the speed of the gesture is used to configure the speed of an indicated transition. In some embodiments, the software module configured to receive gesture input from a user receives the length of the gesture, the length used to configure a characteristic of the one or more transitions, effects, or configurations. In further embodiments, the length of the gesture is used to configure the speed of an indicated transition. In some embodiments, the software module configured to receive gesture input from a user receives the duration of the gesture, the duration used to configure a characteristic of the one or more transitions, effects, or configurations. In further embodiments, the duration of the gesture is used to configure the speed of an indicated transition. In still further embodiments, the speed of the gesture, length of the gesture, duration of the gesture, or a combination thereof is used to configure one or more characteristics of an indicated transition. In some embodiments, the application further comprises a software module configured to present a graphic representation of the video output, the graphic representation comprising an icon representing each edit, each icon indicating a type of edit and one or more video sources used in the edit. In some embodiments, the application further comprises a software module configured to share the video output to a social media forum. In some embodiments, the application further comprises a software module configured to present a graphic representation of the video output, the graphic representation comprising an icon representing each temporal segment of the video output, each icon indicating a type of edit and the number of video sources incorporated in that segment of the video output. In some embodiments, the application further comprises a software module configured to share the video output to a social media forum. In some embodiments, the gesture input from the user is the sole input for the video editing. In some embodiments, the application is a mobile application.

In another aspect, disclosed herein are non-transitory computer-readable storage media encoded with a computer program including instructions executable by a processor to create a live video editing application comprising: a software module configured to present a plurality of video sources, the video sources played simultaneously in a video editing session; a software module configured to receive input from a user in the video editing session, the input indicating one or more of the video sources, the input further indicating one or more transitions, effects, or configurations to apply to the indicated video sources; and a software module configured to dynamically generate a linear graphic representation of the video output in the video editing session, the graphic representation comprising an icon representing each temporal segment of the video output, each icon visually indicating the duration of the segment, an applied transition, effect, or configuration, the number of video sources incorporated in that segment of the video output, and the identity of each video source incorporated in that segment of the video output. In some embodiments, the linear graphic representation of the video output visually indicates a dissolve transition with a color gradient, the colors identifying the video sources. In some embodiments, the linear graphic representation of the video output visually indicates the audio of the video output, wherein the level and identity of each audio source is visually indicated.

In another aspect, disclosed herein are computer-implemented live video editing systems comprising: a digital processing device comprising an operating system configured to perform executable instructions and a memory device; a computer program including instructions executable by the digital processing device to create a live video editing application comprising: a software module configured to present a plurality of video sources, the video sources played simultaneously in a video editing session; a software module configured to receive input from a user in the video editing session, the input indicating one or more of the video sources, the input further indicating one or more transitions, effects, or configurations to apply to the indicated video sources; and a software module configured to dynamically generate a linear graphic representation of the video output in the video editing session, the graphic representation comprising an icon representing each temporal segment of the video output, each icon visually indicating the duration of the segment, an applied transition, effect, or configuration, the number of video sources incorporated in that segment of the video output, and the identity of each video source incorporated in that segment of the video output. In some embodiments, the linear graphic representation of the video output visually indicates a dissolve transition with a color gradient, the colors identifying the video sources. In some embodiments, the linear graphic representation of the video output visually indicates the audio of the video output, wherein the level and identity of each audio source is visually indicated.

DETAILED DESCRIPTION OF THE INVENTION

Figure 1A:
FIGS. 1a, 1b, and 1c show a non-limiting example of a user performing a swipe gesture (also called a "pan") to trigger a dissolve transition; in this case, a user performing a swipe from Camera 1 to Camera 2, wherein the transition occurs in a preview of the final video that the user is creating, which is shown above the source videos.

Described herein, in certain embodiments, are non-transitory computer-readable storage media encoded with a computer program including instructions executable by a processor to create a gestural video editing application comprising: a software module configured to present a plurality of video sources, the video sources played simultaneously in a live video editing session; a software module configured to receive gesture input from a user in the video editing session, the gesture input indicating one or more of the video sources, the gesture input indicating one or more transitions, configurations, or effects to apply to the indicated video sources; and a software module configured to present a video output, the video output generated by editing one or more of the video sources in the video editing session, the editing comprising applying the indicated transitions, effects, or configurations to the indicated video sources.

Also described herein, in certain embodiments, are computer-implemented gestural video editing systems comprising: a digital processing device comprising an operating system configured to perform executable instructions and a memory device; a computer program including instructions executable by the digital processing device to create a gestural video editing application comprising: a software module configured to present a plurality of video sources, the video sources played simultaneously in a live video editing session; a software module configured to receive gesture input from a user in the video editing session, the gesture input indicating one or more of the video sources, the gesture input indicating one or more transitions, effects, or configurations to apply to the indicated video sources; and a software module configured to present a video output, the video output generated by editing one or more of the video sources in the video editing session, the editing comprising applying the indicated transitions, effects, or configurations to the indicated video sources.

Also described herein, in certain embodiments, are non-transitory computer-readable storage media encoded with a computer program including instructions executable by a processor to create a live video editing application comprising: a software module configured to present a plurality of video sources, the video sources played simultaneously in a video editing session; a software module configured to receive input from a user in the video editing session, the input indicating one or more of the video sources, the input further indicating one or more transitions, effects, or configurations to apply to the indicated video sources; and a software module configured to dynamically generate a linear graphic representation of the video output in the video editing session, the graphic representation comprising an icon representing each temporal segment of the video output, each icon visually indicating the duration of the segment, an applied transition, effect, or configuration, the number of video sources incorporated in that segment of the video output, and the identity of each video source incorporated in that segment of the video output.

Also described herein, in certain embodiments, are computer-implemented live video editing systems comprising: a digital processing device comprising an operating system configured to perform executable instructions and a memory device; a computer program including instructions executable by the digital processing device to create a live video editing application comprising: a software module configured to present a plurality of video sources, the video sources played simultaneously in a video editing session; a software module configured to receive input from a user in the video editing session, the input indicating one or more of the video sources, the input further indicating one or more transitions, effects, or configurations to apply to the indicated video sources; and a software module configured to dynamically generate a linear graphic representation of the video output in the video editing session, the graphic representation comprising an icon representing each temporal segment of the video output, each icon visually indicating the duration of the segment, an applied transition, effect, or configuration, the number of video sources incorporated in that segment of the video output, and the identity of each video source incorporated in that segment of the video output.

Video

In some embodiments, the systems, methods, and media described herein include a software module configured to present a plurality of video sources. In further embodiments, the video sources are played simultaneously in a live video editing session. Any suitable number of video sources are presented and played. In various embodiments, about 2, 3, 4, 5, 6, 7, 8, 9, 10, 11, 12, 13, 14, 15, 16, 17, 18, 19, 20 or more video sources are presented simultaneously. In a particular embodiment, about four video sources are presented simultaneously.

In some embodiments, the systems, methods, and media described herein include a software module configured to present a video output. In further embodiments, the video output is generated by editing one or more of the video sources in the video editing session. In still further embodiments, the editing comprises applying indicated transitions, effects, and/or configurations to indicated video sources.

In some embodiments, a preview of the final video output is presented in the video editing user interface. In such embodiments, the transitions, effects, and configurations indicated are visible in real-time, or substantially in real-time, in the preview of the final video output. In other embodiments, there is no preview of the final video output and only source videos are visible in the video editing interface. In such embodiments, the transitions, effects, and configurations indicated are not be visible in real-time, even though they are being indicated in real-time as the source videos play. In some embodiments, the indicated edits (e.g., transitions, effects, configurations, etc.) are applied as they are indicated to generate a video output. In other embodiments, the indicated edits are applied at a later time to generate a video output. In further embodiments, the edits are applied in response to a user request to generate a video output.

In some embodiments, the videos are stored on a user's computing device. In further embodiments, the videos are stored on the device used to capture the video source files. In other embodiments, the videos are stored on a remote device. In further embodiments, the videos are stored on a remote device, such as a server and streamed to a user's computing device for viewing. In still further embodiments, the video editing process is performed without any video files residing on a user's mobile device and the videos are streamed to a user's device for viewing, editing, and the like. In other embodiments, the systems, methods, and media described herein are configurable and optionally perform streaming and playing of locally-stored videos.

Many video formats are suitable including, by way of non-limiting examples, Windows® Media Video (WMV), Windows® Media®, Motion Picture Experts Group (MPEG), Audio Video Interleave (AVI), Apple® Quick-Time®, RealMedia®, Flash Video, Motion JPEG (M-JPEG), WebM, and Advanced Video Coding High Definition (AVCHD). In some embodiments, video is uncompressed (e.g., RAW format). In other embodiments, video is compressed. Both lossy and lossless video CODECs are suitable including, by way of non-limiting examples, DivX™, Cineform, Cinepak, Dirac, DV, FFV1, H.263, H.264, H.264 lossless, JPEG 2000, MPEG-1, MPEG-2, MPEG-4, On2 Technologies (VP5, VP6, VP7, and VP8), RealVideo, Snow lossless, Sorenson Video, Theora, and Windows Media Video (WMV).

In some embodiments, suitable video media is standard-definition. In further embodiments, a standard-definition video frame includes about 640× about 480 pixels, about 640× about 380, about 480× about 320 pixels, about 480× about 270 pixels, about 320× about 240 pixels, or about 320× about 180 pixels. In other embodiments, suitable video media is high-definition. In further embodiments, a high-definition video frame includes at least about 1280× about 720 pixels or at least about 1920× about 1080 pixels.

Many audio formats are suitable including, by way of non-limiting examples, MP3, WAV, AIFF, AU, Apple® Lossless, MPEG-4, Windows Media®, Vorbis, AAC, and Real Audio®.

Gestures

In some embodiment, the systems, methods, and media described herein include a software module configured to receive gestural input from a user in a video editing session. In further embodiments, the gestural input indicates one or more video sources and one or more transitions, effects, or configurations to apply to the indicated video sources. As used herein, in some embodiments, a "gesture" refers to physical motion performed by a user to trigger or control a function of a software application. Many types of gestures are suitable. In some embodiments, a user performs a gesture with, by way of non-limiting examples, one or more of their fingers (or thumbs), one or both of their hands, their head, or one or both of their eyes. In some embodiments, a suitable gesture is performed by contacting a processing device and the user's motion is detected by a touch screen or multi-touch screen associated with the processing device. In further embodiments, suitable gestures include, by way of non-limiting examples, single-finger taps, multi-finger taps, single-finger swipes or pans, multi-finger swipes or pans, pinches, reverse pinches, circular or looping motions, and the like.

In some embodiments, a suitable gesture is performed without contacting a processing device and the user's motion is detected by a camera, Leap Motion, Kinect, or similar device associated with the processing device. For example, a user optionally hovers an extended finger over Camera 2 to trigger a cut transition.

In some embodiments, a suitable gesture is a spoken sound, word, or phrase, the sound of which is detected by a microphone associated with a processing device. For example, a user optionally says "Dissolve transition to Camera Two, duration one second, . . . NOW" to trigger a dissolve transition lasting one second. By way of further example, the transition is identified when the user says "Dissolve transition," the video source is identified when the user says "Camera 2," the duration of the transition is identified when the user says "duration one second," and the transition is triggered when the user says "NOW."

Several aspects of a user's gesture are suitably detected or measured and utilized by the systems, methods, and media described herein to receive input from a user, e.g., determine the user's intent and or apply the intended function. In some embodiments, the starting point of the gesture is used. In some embodiments, the ending point of the gesture is used. In some embodiments, one or more intermediate points of the gesture are used. In some embodiments, a pathway defined by the gesture is used. In some embodiments, the duration (in time) of the gesture is used. In some embodiments, the speed of the gesture is used. In some embodiments, the force of the gesture is used.

Transitions, Effects, and Configurations

In some embodiments, the systems, methods, and media described herein utilize user gestures that trigger transitions, effects, and/or configurations in a video output. Many transitions, effects, and configurations are suitable. In some embodiments, the transitions, effects, and/or configurations are applied only to audio content. In other embodiments, the transitions, effects, and/or configurations are applied only to visual content. In yet other embodiments, the transitions, effects, and/or configurations are applied only to both audio and visual content.

Many transitions, effects, and configurations are suitable. In various embodiments, suitable transitions include, by way of non-limiting examples, cuts, dissolves, fades, and wipes. In various embodiments, suitable video effects include, by way of non-limiting examples, color replacement, animated effects, pixelization, focus drops, lighting effects, and the like. In various embodiments, suitable audio effects include, by way of non-limiting examples, echo, chorus, reverb, distortion, delay, equalization, pitch shift, crescendo and decrescendo of musical background audio tracks, and the like. In various embodiments, suitable configurations include, by way of non-limiting examples, picture-in-picture and split screen.

In some embodiments, suitable transitions include fade transitions. In further embodiments, a fade is a transition from video to a single color. Any color is suitable, including, for example, black and white.

In some embodiments, suitable transitions include cut (e.g., jump cut, etc.) transitions. In further embodiments, a cut is an instant change from one source video to another. In some embodiments, cut transitions are indicated by tap gestures. In further embodiments, a user taps a source video to indicate a cut transition from the current source video to the tapped source video (the target video source). In some embodiments, a one-finger tap indicates a cut transition to the visual content of the target video source. In some embodiments, a two-finger tap indicates a cut transition to the audio and visual content of the target video source. In some embodiments, cut transitions are indicated by non-tap gestures. For example, in some embodiments, the gesture input comprises a circular or looping motion of a finger touching the screen, indicating a cut transition to the touched video source.

In some embodiments, suitable transitions include dissolve transitions (e.g., mix transitions, crossfade transitions, etc.). In further embodiments, each of these transitions involves a gradual fade from one video to another. In some embodiments, dissolve transitions are indicated by swipe gestures. In further embodiments, a single-finger swipe gesture starting on a first video source and ending on a second video source triggers a dissolve transition from the first video source to the second video source. In still further embodiments, a single-finger swipe gesture ending on a target video source triggers a dissolve transition from the video source currently used in the video output (e.g., the currently selected video) to the target source video regardless of the video source on which the swipe began, and regardless of what video sources the swipe may have "swiped through." In some cases, the dissolve transition happens as the swipe gesture is being made. In other cases, and more typically, the dissolve transition begins after the swipe is done.

In some embodiments, suitable transitions include wipe transitions. In further embodiments, a wipe is where one shot is progressively replaced by another shot in a geometric pattern. In still further embodiments, there are many suitable types of wipe transitions, from straight lines to complex shapes. A wipe transition suitably proceeds in any direction across the video output. In some embodiments, wipe transitions are indicated by swipe gestures. In further embodiments, a two-finger-swipe gesture triggers a wipe transition. In a particular embodiment, the gesture input comprises a five-finger gesture, the fingers moving away from each other (e.g., reverse pinch), the gesture performed on a target video source, the five-fingered gesture indicating a star wipe transition from the video source currently providing content for the video output to the target video source. In some cases, the wipe transition happens as the swipe gesture is being made. In other cases, and more typically, the wipe transition begins after the swipe is done.

In some embodiments, suitable transitions include "dreamy" or "ripple" transitions. In further embodiments, a ripple transition is a change from one source video to another via an animated ripple effect. In some embodiments, ripple transitions are indicated by tap gestures. In further embodiments, a user performs a four-finger tap gesture on a source video to indicate a ripple transition from the current source video to the tapped source video (the target video source). In further embodiments, a user performs a back-and-forth motion with multiple fingers, as if scratching the touch screen to indicate a dreamy or ripple transition, or another exotic transition.

In some embodiments, suitable configurations include a split screen configuration. In further embodiments, a split screen configuration is a simultaneous display of a plurality of video sources in distinct portions of the video output. Any suitable number of video sources is optionally displayed simultaneously in the video output. In various embodiments, 2, 3, 4, 5, 6, 7, 8, 9, 10 or more video sources are displayed simultaneously in the video output in a split screen configuration. In some embodiments, split screen configurations are indicated by tap gestures. In further embodiments, tapping two source videos simultaneously triggers a split screen configuration. In further embodiments, tapping more videos simultaneously triggers even more of a split screen effect (i.e., three-way, four-way, five-way, six-way splits, etc.). Many split screen configurations are suitable including horizontal, vertical, diagonal, and polygonal arrangements. For example, in a particular embodiment, a diagonal line splits the screen into two portions, where half of Camera 1 is shown above the diagonal, and half of Camera 2 is shown below. In another particular embodiment, there is empty space on the top and bottom and the entireties of Cameras 1 and 2 are shown in the final video output—just smaller so that they can fit side by side (hence the empty space on the top and bottom in this case).

In some embodiments, suitable configurations include a picture-in-picture configuration. In further embodiments, a picture-in-picture configuration is a simultaneous display of a plurality of video sources wherein one or more video sources is smaller and set inside another video source to form the video output. Any suitable number of video sources is optionally displayed inside another video source to form the video output. In various embodiments, 2, 3, 4, 5, 6, 7, 8, 9, 10 or more video sources are displayed simultaneously in the video output in a picture-in-picture configuration. In some embodiments, picture-in-picture configurations are indicated by tap gestures. In further embodiments, tapping one video source with two fingers while tapping another video source with one finger triggers a picture-in-picture configuration. In still further embodiments, the video source tapped with two fingers is set inside. In other embodiments, the video source tapped with one finger is set inside.

In some embodiments, the systems, methods, and media described herein mapping one or more gestures, including combinations of gestures, with one or more transitions and/or effects.

In addition to the category of gesture (e.g., swipe, tap, etc.), and the number of fingers, other properties of the gestures are optionally used. Specifically, the length in distance (pixels, millimeters, etc.) of a swipe, the length in time of a swipe (seconds, milliseconds, etc.), the velocity of a swipe (pixels/second, millimeters/second, etc.), and/or the path of a swipe are optionally measured and used to calculate properties of the transitions. In some embodiments, these properties include, by way of non-limiting examples, the duration in time of a dissolve, the exact curve which defines the nature of the transition (such as describing the instantaneous rates of change of frames in a wipe transition or the instantaneous intensities, opacities, and/or alphas of videos in a dissolve transition).

Particular Non-Limiting Embodiments

Figure 1B:
Figure 1C:

Referring to FIGS. 1a-1c, in a particular exemplary embodiment, a user performs a one-finger swipe gesture. The swipe gesture starts on a first video source in the upper left position of a block of four video sources (also optionally referred to as Camera 1) all playing simultaneously (see FIG. 1a). The swipe gesture ends on a second video source in the upper right position of the block (also optionally referred to as Camera 2) (see FIG. 1c). In these embodiments, the gesture indicates a dissolve (e.g., crossfade) transition to the second video source.

Continuing to refer to FIGS. 1a-1c, in these non-limiting embodiments, the transition occurs in a preview of the final video output that the user is creating, which is shown above the source videos. FIGS. 1a-1c depict different stages of the dissolve transition. Although these images depict the dissolve happening at the same time as the user performs the swipe gesture, in another embodiment the user might first perform the gesture and then, once the gesture has been completed and categorized as a one-finger swipe ending on Camera 2, the crossfade finally begins in the preview; the timing of the beginning of the transition in the final video optionally corresponds either to the time during which the user began the gesture, or when the user ended the gesture, or the like.

Figure 2:
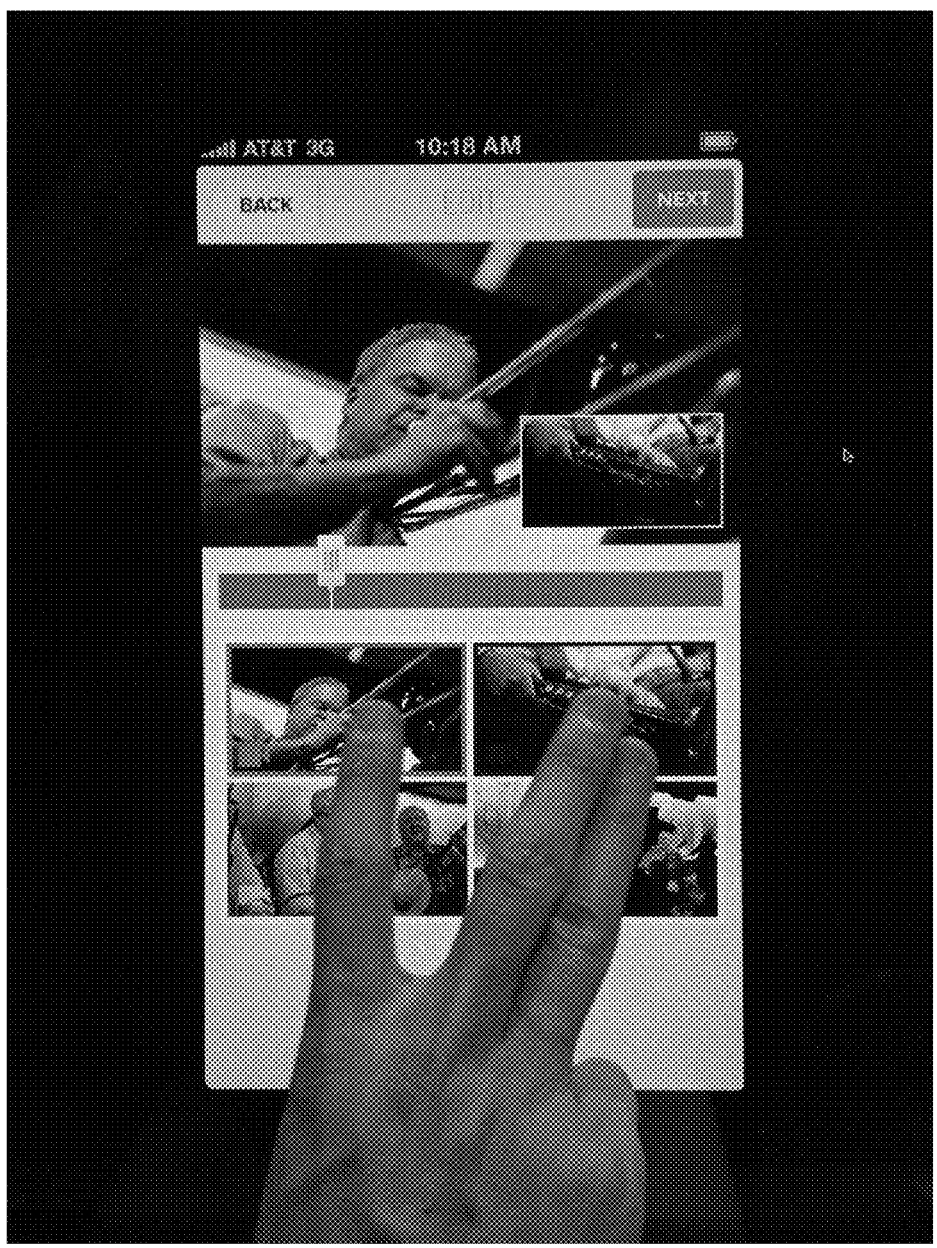
FIG. 2 shows a non-limiting example of a user performing a three-fingered tap gesture to trigger picture-in-picture; in this case, the user has tapped Camera 1 with one finger and Camera 2 with two fingers, and so the preview shows Camera 1 with a Camera 2 inset.

Referring to FIG. 2, in a particular exemplary embodiment, a user performs a multi-finger tap gesture. In this embodiment, the user simultaneously performs a one-finger tap on a first video source in the upper left position of a block of four video sources (also optionally referred to as Camera 1) all playing simultaneously and a two-finger tap on a second video source in the upper right position of the block (also optionally referred to as Camera 2). In this embodiment, the gesture indicates a picture-in-picture configuration with the second video source inset within the first video source in the video output. In alternative embodiments, the gesture optionally indicates a picture-in-picture configuration with the first video source inset within the second video source in the video output.

Figure 3:
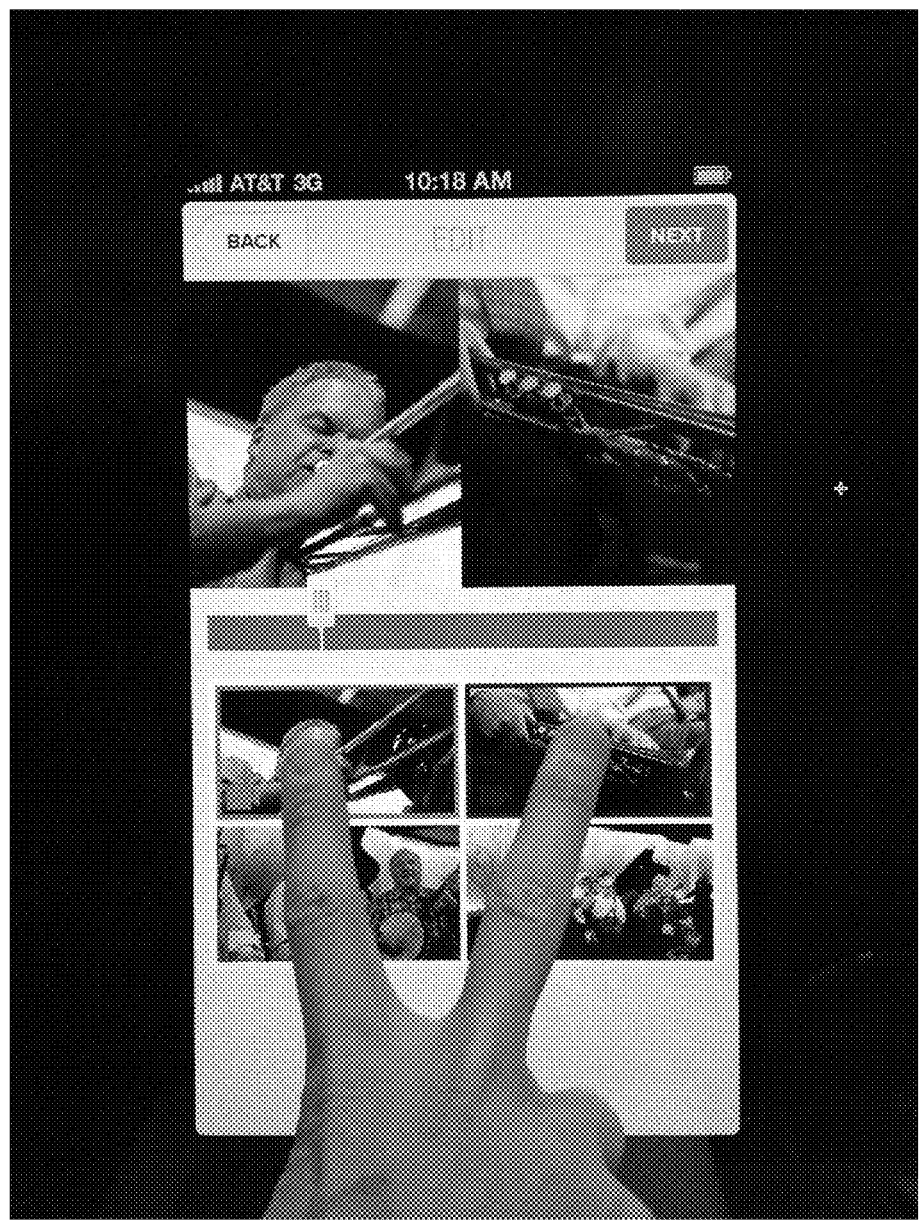
FIG. 3 shows a non-limiting example of a user performing a two-fingered tap gesture to trigger split-screen; in this case, the user has tapped Camera 1 with one finger and Camera 2 with one finger, and so the preview shows a split-screen configuration including Camera 1 and Camera 2.

Referring to FIG. 3, in a particular exemplary embodiment, a user performs a multi-finger tap gesture. In this embodiment, the user simultaneously performs a one-finger tap on a first video source in the upper left position of a block of four video sources (also optionally referred to as Camera 1) all playing simultaneously and a one-finger tap on a second video source in the upper right position of the block (also optionally referred to as Camera 2). In this embodiment, the gesture indicates a transition to a split screen effect, or configuration, in which a tranche of the first video source and a tranche of the second video source are simultaneously presented in the video output. In this case, a tranche of Camera 1 occupies the left half of the preview while a tranche of Camera 2 occupies the right half. However, in other embodiments, the division is optionally a horizontal line instead of a vertical one, or a diagonal line giving Camera 1 the top-left triangular half while giving Camera 2 the bottom-right triangular half.

Figure 4:
FIG. 4 shows a non-limiting example of a user performing a four-fingered tap gesture to trigger 4-camera split-screen; in this case, the user has tapped each camera with one finger, and so the preview shows a split-screen configuration including each camera.
Figure 5A:
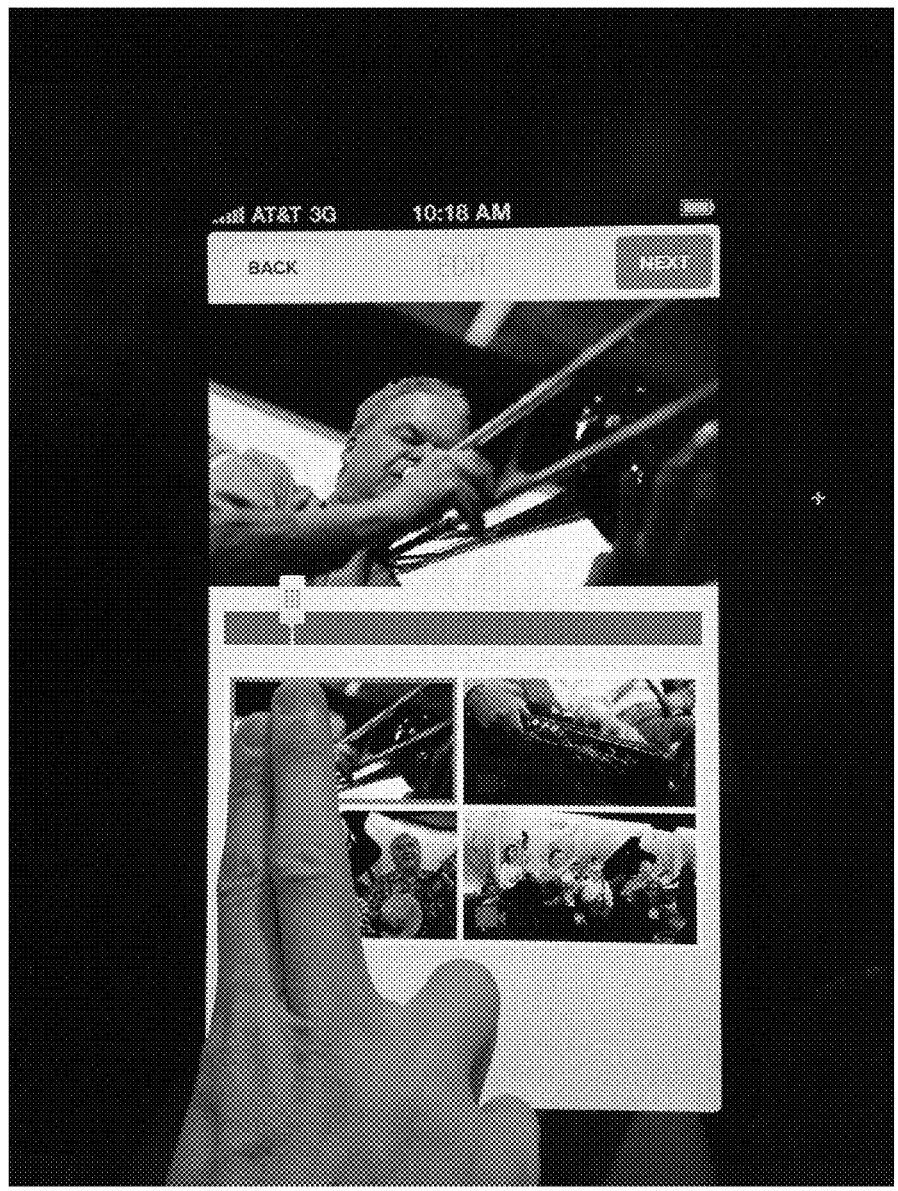
FIGS. 5a, 5b, 5c, and 5d show a non-limiting example of a user performing a two-finger swipe gesture to trigger a wipe transition; in this case, a user performing a swipe from Camera 1 to Camera 2, wherein the preview of the final video that the user is creating is shown above.
Figure 5B:
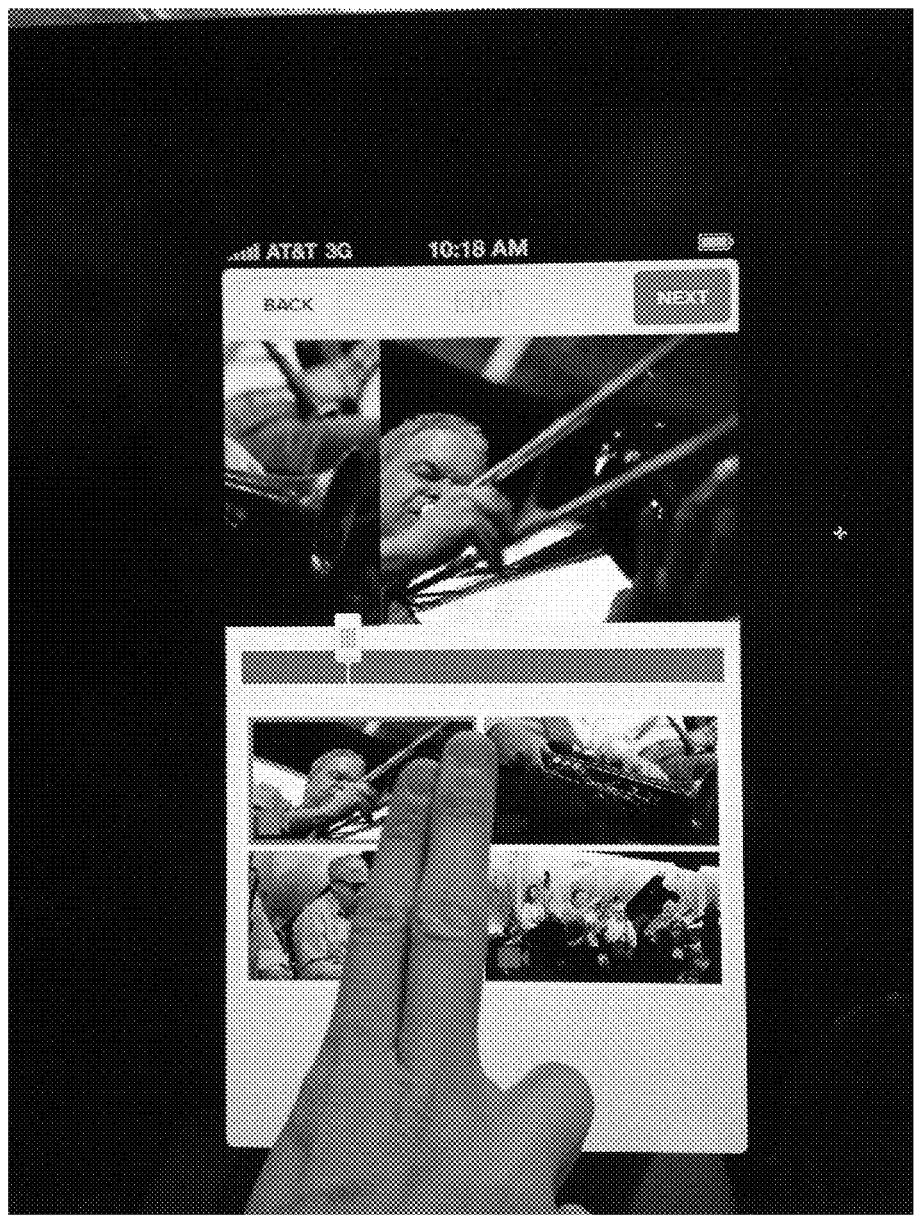
Figure 5C:
Figure 5D:

Referring to FIG. 4, in a particular exemplary embodiment, a user performs a multi-finger tap gesture. In this embodiment, the user has tapped each of four video sources (e.g., cameras) with one finger. Further in this embodiment, a preview of the video output shows a split-screen configuration including each camera. Although the figure illustrates one finger on each video source, the transition to four-camera split-screen is optionally triggered by simply tapping four fingers anywhere over the source videos, not necessarily distributed as one finger per camera, or the four-fingered tap gesture is optionally performed elsewhere on the screen, not necessarily all contained in the area showing the source videos (cameras).

Referring to FIGS. 5a-5d, in a particular exemplary embodiment, a user performs a two-finger swipe gesture. The swipe gesture starts on a first video source in the upper left position of a block of four video sources (also optionally referred to as Camera 1) all playing simultaneously (see FIG. 5a). The swipe gesture ends on a second video source in the upper right position of the block (also optionally referred to as Camera 2) (see FIG. 5d). In these embodiments, the gesture indicates a wipe transition from the first video source to the second video source. In this case, a preview of the final video output that the user is creating is shown above the source videos. FIGS. 5a-5d show different stages of the wipe transition. Although these images depict the wipe transition happening as the user performs the two-fingered swipe gesture, in another embodiment the user optionally first performs the gesture and then, once the gesture has been completed and categorized as a two-finger swipe from Camera 1 to Camera 2, only then does the wipe transition begin in the preview. In some embodiments, the timing of the beginning of the transition in the final video output optionally corresponds either to the time during which the user began the gesture, or when the user ended the gesture, or something else. Although, in this embodiment, the images have the swipe gesture begin on Camera 1, in another embodiment, the video source on which the wipe began could be ignored by the software, and the wipe transition goes from a first video source to a second video source, where the first video source is whichever Camera was selected or playing when the two-finger swipe began, and the second video source is the video source on which the two-finger swipe ended. In another embodiment, the wipe transition could be triggered by one-finger or three-finger swipe gestures rather than two-finger swipe gestures, or by a one-, two-, three-, four- or five-finger tap on the video source to which the video output would transition to from the previously selected video source.

Iconic Representation of Video

In some embodiments, the systems, methods, and media described herein include a graphic user interface (GUI) element that provides a graphic (e.g., iconic) representation of the content of the video output. In further embodiments, the GUI element provides a graphic representation of each edit used to generate the video output from the plurality of video sources. In still further embodiments, graphic representations of each edit are placed side-by-side to create a linear representation of the video output. In this way, in some embodiments, the graphic representations form a signature or fingerprint for a particular video editing session that generates a particular video output. In some cases, the linear representation of the video output comprises a graphical "language" that allows a skilled artisan to "read" the editing and understand the sequence of video sources, transitions/effects/configurations, audio sources, tempo, and other qualities of the edited output.

Many graphic representations (e.g., icons, avatars, etc.) are suitable. In some embodiments, each of the plurality of video sources is assigned a shape. In further embodiments, a graphic representation of an edit uses the assigned shapes to indicate the nature of the edit and the video source or sources used in the edit to generate the video output. In some embodiments, each of the plurality of video sources is assigned a color. In further embodiments, a graphic representation of an edit uses the assigned colors to indicate the nature of the edit and the video source or sources used in the edit to generate the video output.

In some embodiments, the graphic representation of the content of the video output visually indicates the levels of each audio source throughout the duration of the audio, for example, as one or more waveforms. In some embodiments, each of the audio sources is assigned a color. In further embodiments, a graphic representation uses the assigned colors to indicate the nature of the audio and the audio source or sources used to generate the video output, for example, as color-coded waveforms.

Figure 6:
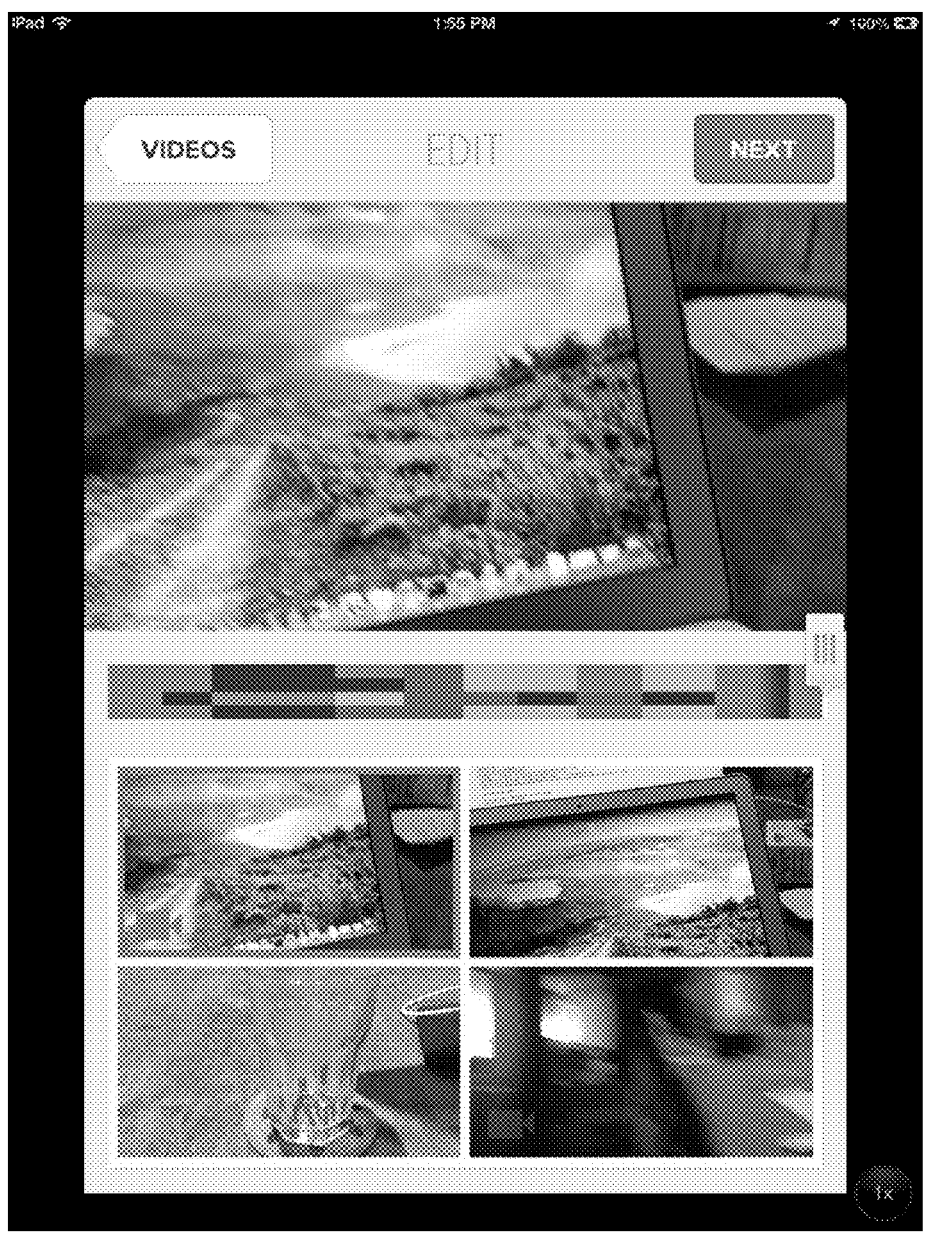
FIG. 6 shows a non-limiting example of a gesture-based, live video editing application; in this case, an application including a bar in the user interface, just above the video sources and just below the video output preview, that provides a graphic (e.g., iconic) representation of each edit used to generate the video output.

Referring to FIG. 6, in a particular exemplary embodiment, Cameras 1, 2, 3, and 4 are assigned the colors light blue, dark blue, orange, and green respectively. In this embodiment, a linear representation of the video output is displayed immediately above four video sources and immediately below a preview of the source video. The linear representation in this case includes a series of 12 iconic representations of video segments, including one non-instantaneous transition. The arrangement of the assigned colors in each icon indicates the source video or videos playing in the video output during that segment, and aspects of their configuration.

Continuing to refer to FIG. 6, for example, in this embodiment, an icon with a single, solid block of color indicates that only the video indicated by that color is playing during the segment represented by the icon. By way of further example, an icon with a gradient from a first color to a second color indicates a dissolve transition from the Camera assigned the first color to the Camera assigned the second color. By way of further example, an icon with a block of a first color interrupted by a stripe of a second color indicates a picture-in-picture configuration with the Camera assigned the second color inset in the Camera assigned the first color. By way of still further example, an icon with four equal stripes of color indicates a four-way grid view split screen configuration utilizing each of the four Cameras.

Continuing to refer to FIG. 6, in a particular embodiment a graphic representation of the content of a video output includes a series of icons arranged linearly and read left to right. Each Camera is assigned a color. The shapes and colors of the icons indicate the edits used to generate the video output and depict the "story" of its production. The graphic representation in this case indicates a video output that:

starts on Camera 1;
then cuts to picture-in-picture with Camera 2 inset;
then cuts to have Camera 2 playing with Camera 1 inset;
then cuts to four-way grid view;
then cuts to Camera 4;
then cuts to have Camera 3 play with Camera 4 inset;
then the inset cuts to be Camera 2;
then cuts to Camera 1 playing with Camera 4 inset;
then cuts to Camera 3 playing with Camera 2 inset;
then cuts to Camera 1;
then does a dissolve transition to Camera 2; and
then cuts to Camera 2.

Figure 7:
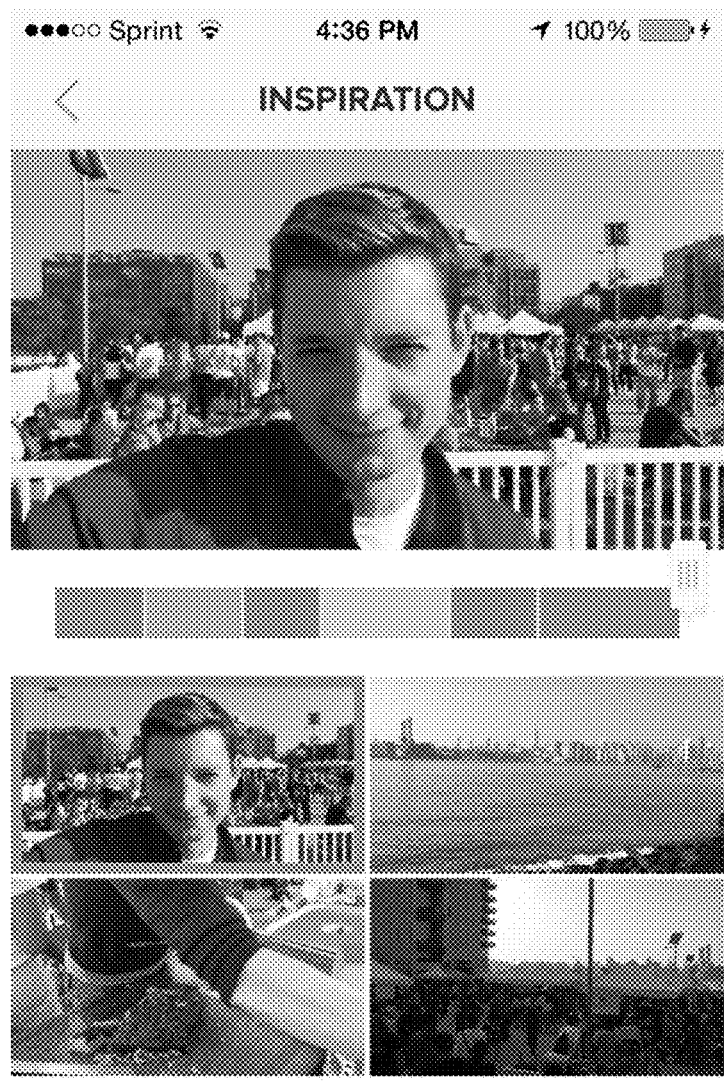
FIG. 7 shows a non-limiting example of a video edited from four sources with a gesture-based, live video editing application; in this case, a video including five cut transitions, which are graphically represented in the application interface, between video sources.

Referring to FIG. 7, in a particular exemplary embodiment, a user interface for a gesture-based video editing application includes four video sources, captured using a mobile device executing the application, and arranged in a 2-by-2 grid at the bottom of the screen. Each video source (also called a camera) is associated with a color, which frames the video source when it is selected. In this embodiment, the user interface also includes a linear, graphical representation of video editing applied to the sources by the user (mid-screen) to generate an edited video output (top of screen). In this embodiment, the user has applied cut transitions by using one-finger tap gestures to indicate particular video sources while the sources (and the live output) are simultaneously playing. The cut transitions are represented in the linear, graphical representation of the video editing as sharply defined blocks. The blocks are color coded to match the video source applied and the horizontal size of each block indicates the length of time that the source is used as the source of the edited video output. Further, in this embodiment, the user interface includes a scrub bar that allows the user to progress forward and backward through the sequence of edits depicted by the linear, graphical representation of the video editing.

Figure 8:
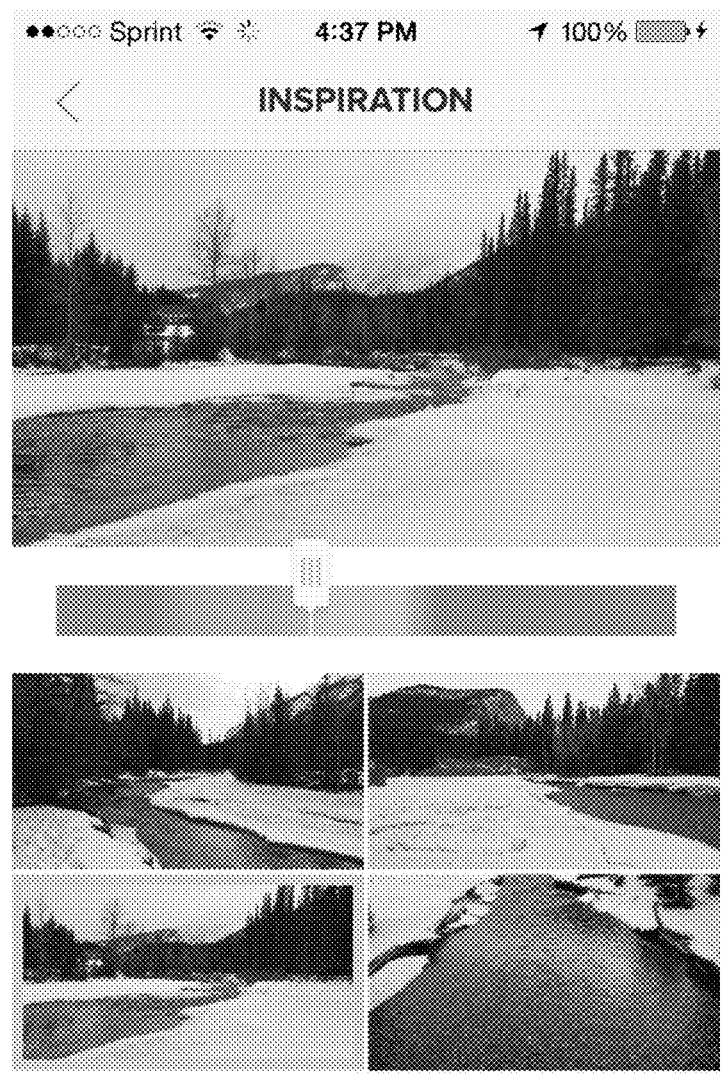
FIG. 8 shows a non-limiting example of a video edited from four sources with a gesture-based, live video editing application; in this case, a video including four dissolve transitions, which are graphically represented in the application interface, between video sources.

Referring to FIG. 8, in a particular exemplary embodiment, a user interface for a gesture-based video editing application includes a linear, graphical representation of video editing applied to the sources by the user (mid-screen). In this embodiment, the user has applied dissolve transitions by using one-finger swipe gestures to indicate particular video sources while the sources (and the live output) are simultaneously playing. The dissolve transitions are represented in the linear, graphical representation of the video editing as blocks with color gradients between them. The blocks are color coded to match the video source applied and the horizontal size of each block indicates the length of time that the source is used as the source of the edited video output.

Figure 9:
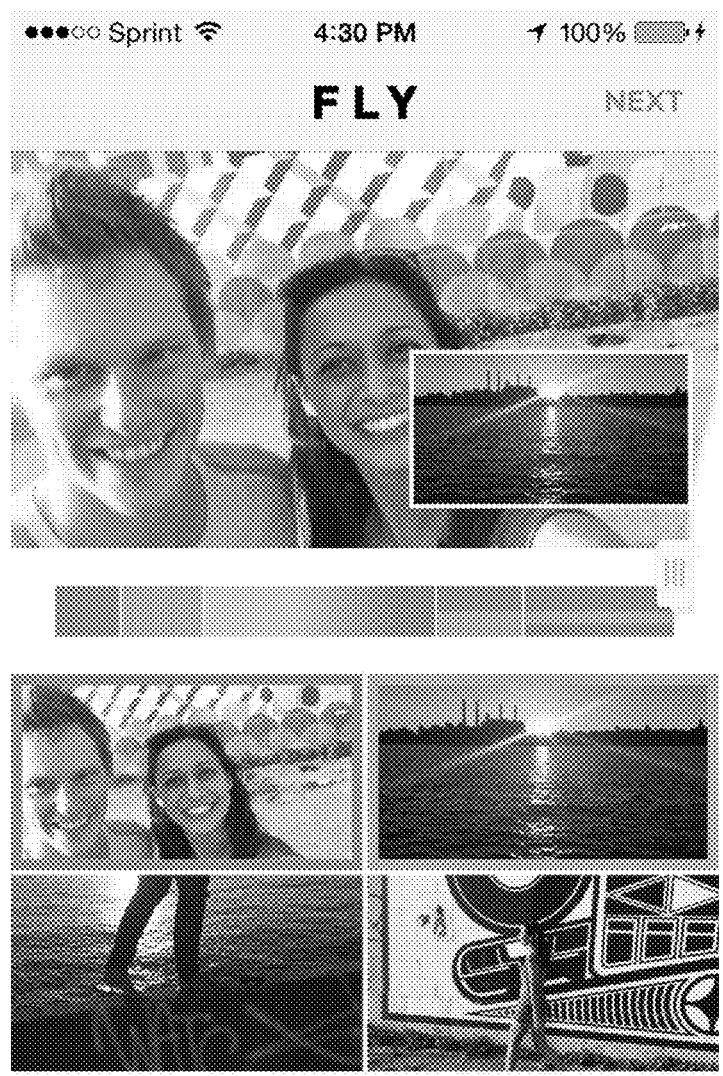
FIG. 9 shows a non-limiting example of a video edited from four sources with a gesture-based, live video editing application; in this case, a video including five transitions/effects (including cuts, a dissolve, a split screen, and a picture-in-picture), which are graphically represented in the application interface.

Referring to FIG. 9, in a particular exemplary embodiment, a user interface for a gesture-based video editing application includes a linear, graphical representation of video editing applied to the sources by the user (mid-screen). In this embodiment, the user has applied a series of transitions, effects, and configurations by using a variety gestures to indicate particular video sources while the sources (and the live output) are simultaneously playing. In this embodiment, the user has applied cuts, dissolves, split screen configurations (applied by tapping two video sources at the same time), and picture-in-picture configurations (applied by tapping a video source with two fingers). The blocks are color coded to match the video source(s) applied and the horizontal size of each block indicates the length of time that the source(s) is/are used as the source of the edited video output.

Figure 10:
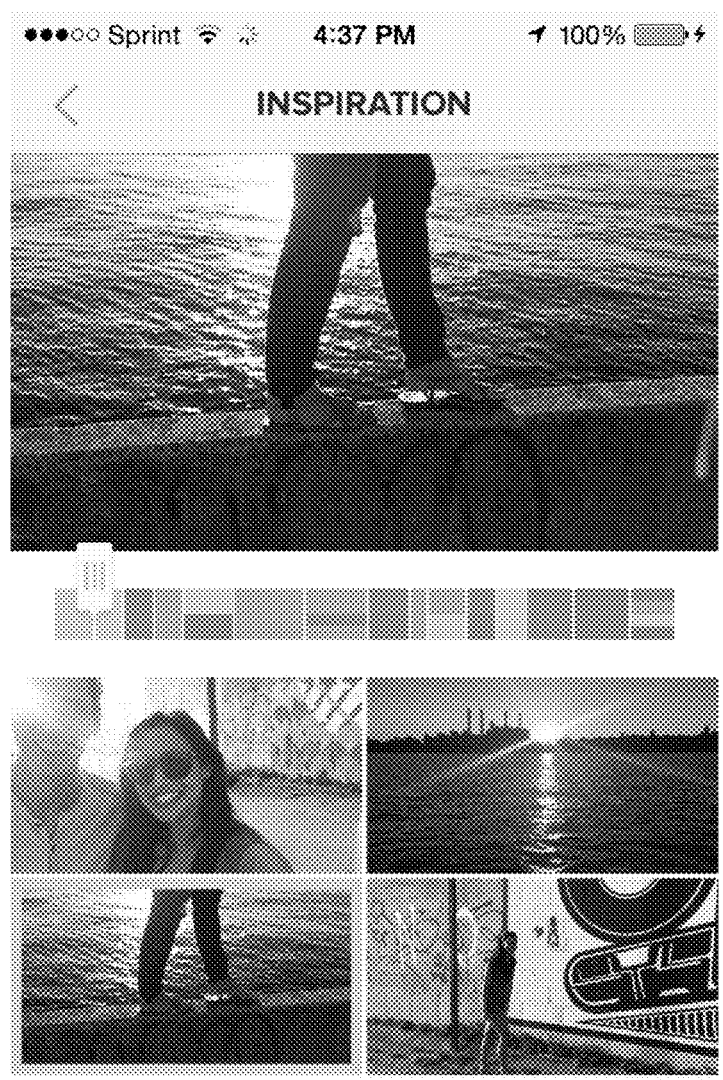
FIG. 10 shows a non-limiting example of a video edited from four sources with a gesture-based, live video editing application; in this case, a video including thirteen transitions/effects (including cuts, split screens, and picture-in-pictures), which are graphically represented in the application interface.

Referring to FIG. 10, in a particular exemplary embodiment, a user interface for a gesture-based video editing application includes a linear, graphical representation of video editing applied to the sources by the user (mid-screen). In this embodiment, the user has applied a series of transitions, effects, and configurations by using a variety gestures to indicate particular video sources while the sources (and the live output) are simultaneously playing. In this embodiment, the user has applied cut transitions (applied by tapping a video source with one finger), split screen configurations (applied by tapping multiple video sources at the same time), and picture-in-picture configurations (applied by tapping a video source with two fingers). The blocks are color coded to match the video source(s) applied and the horizontal size of each block indicates the length of time that the source(s) is/are used as the source of the edited video output.

Further Non-limiting Features

Figure 11:
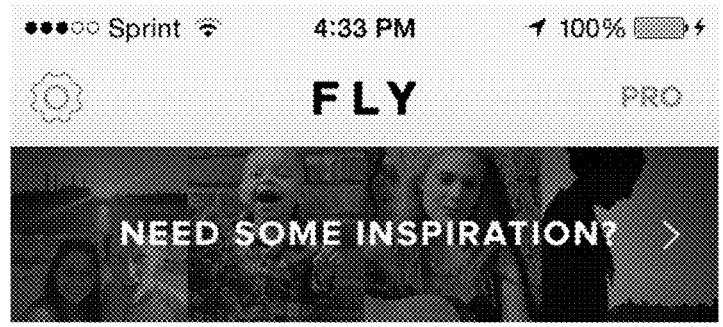
FIG. 11 shows a non-limiting example of a gesture-based, live video editing application; in this case, an application including an introductory interface screen allowing a user to import video sources, capture video sources, and add music to a video.
Figure 11:
Figure 11:
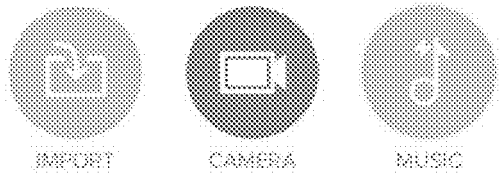

Referring to FIG. 11, in a particular exemplary embodiment, a user interface for a gesture-based video editing application includes an introductory screen. In this embodiment, the interface allows the user to obtain video sources to edit either by importing video sources into the application that have been previously recorded or by capturing new video using the camera of the device executing the application. Further in this embodiment, the interface allows the user add music to a video by selecting one or more songs from an application library or from the user's music.

Figure 12:
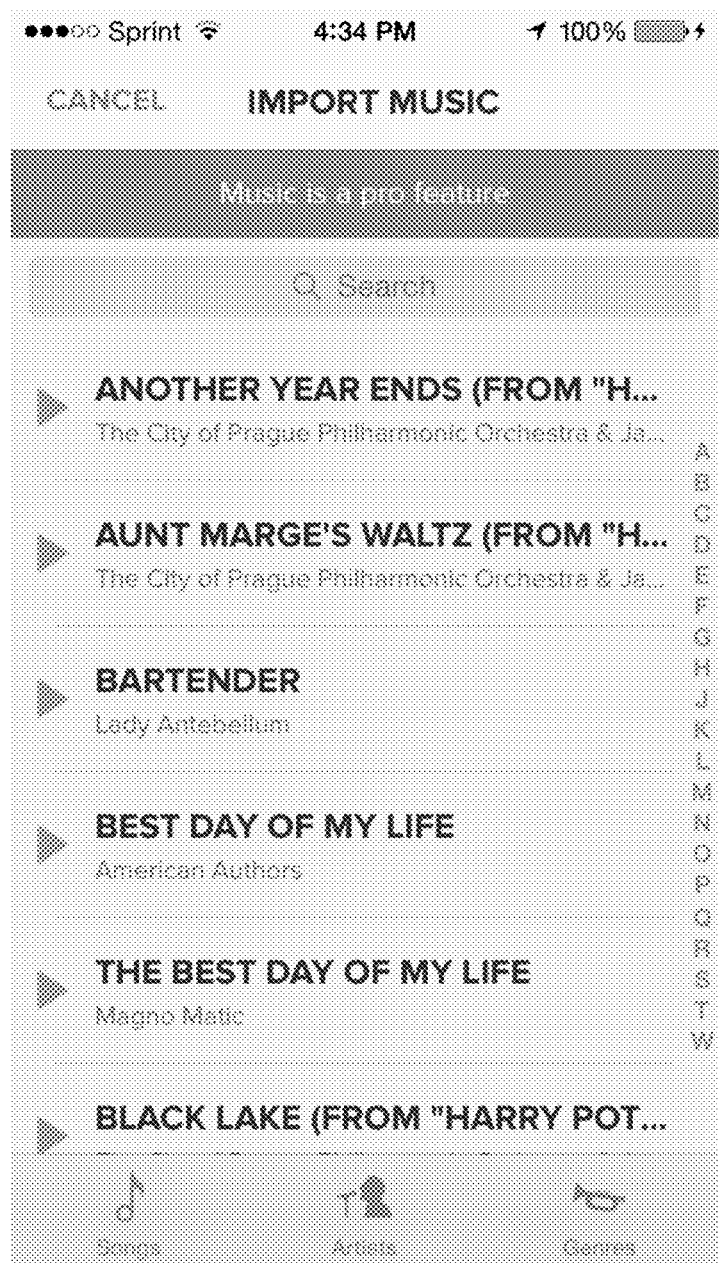
FIG. 12 shows a non-limiting example of a gesture-based, live video editing application; in this case, an application including an interface screen for allowing a user to select music to add to a video, wherein the music is optionally sorted by song, artist, or genre.

Referring to FIG. 12, in a particular exemplary embodiment, a user interface for a gesture-based video editing application includes an import music screen allowing the user to add music to a video. In this embodiment, the interface has features to easily find music by sorting by song, artist, or genre.

Figure 13:
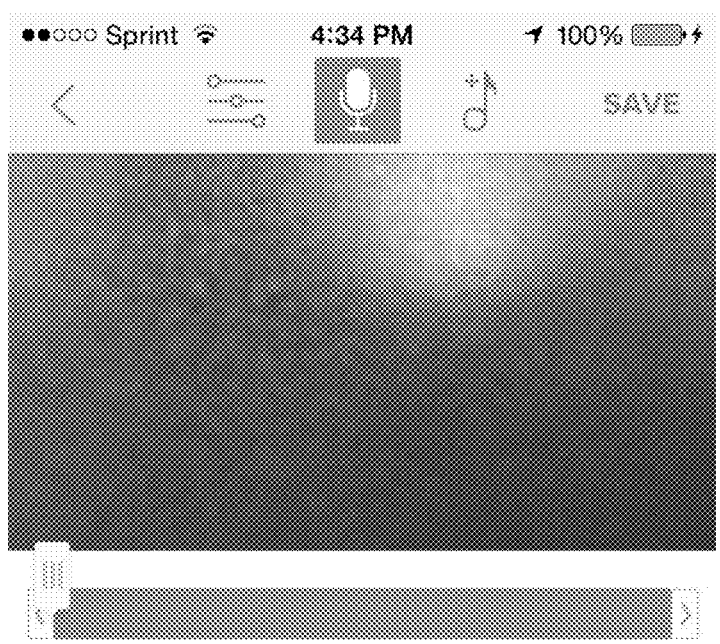
FIG. 13 shows a non-limiting example of a gesture-based, live video editing application; in this case, an application including an interface screen for allowing a user to record audio using a device microphone.
Figure 13:
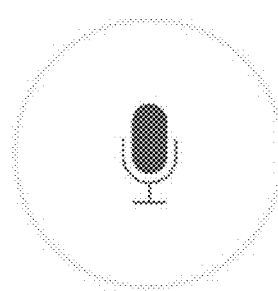

Referring to FIG. 13, in a particular exemplary embodiment, a user interface for a gesture-based video editing application includes an audio recording screen allowing the user to add narration and/or environmental audio to a video by using the microphone of a device executing the application.

Figure 14:
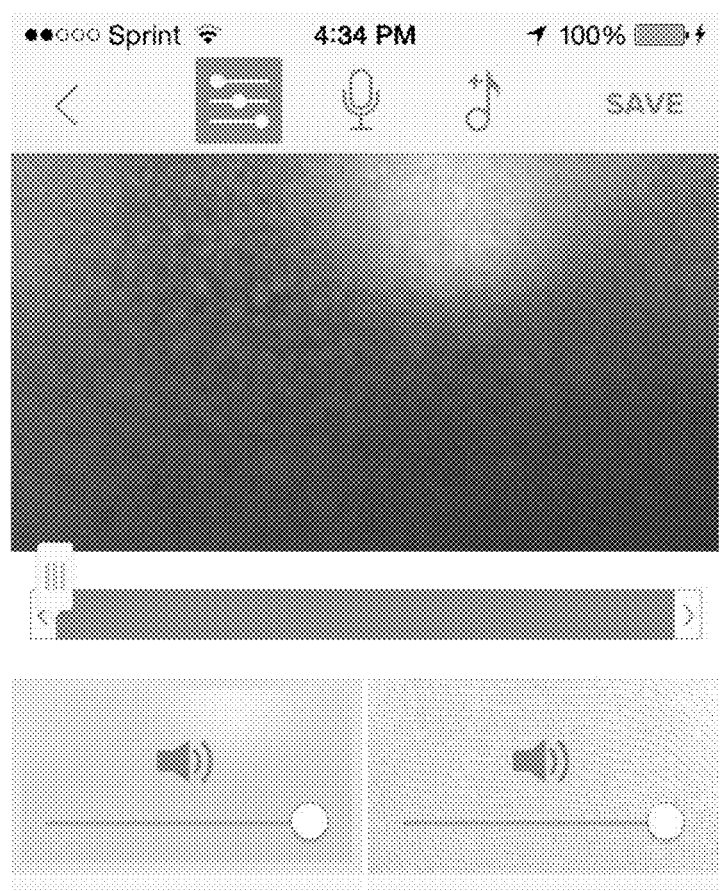
FIGS. 14 and 15 shows a non-limiting example of a gesture-based, live video editing application; in this case, an application including an interface screen for allowing a user to adjust and balance volume of different audio sources, including music, narration, and the audio associated with independent video sources.

Referring to FIG. 14, in a particular exemplary embodiment, a user interface for a gesture-based video editing application includes an audio balancing screen. In this embodiment, the interface has features allowing the user to independently adjust and balance volume of different audio sources including audio associated with each video source, recorded audio, and imported music.

Figure 15:
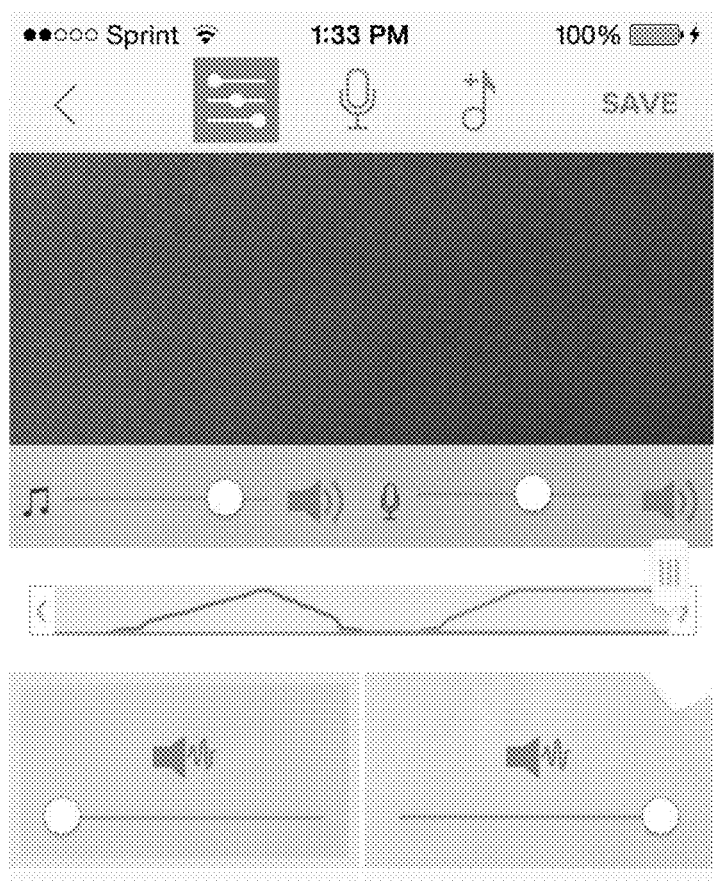

Referring to FIG. 15, in a particular exemplary embodiment, a user interface for a gesture-based video editing application includes live audio editing tools. In this embodiment, the interface allows a user to adjust audio, on-the-fly, during playback of the video output. For example, in this embodiment, selected music and recorded audio, as well as the audio for each of two respective video sources is, independently adjustable during playback in an editing session. A user optionally uses the live audio editing tools set volume levels to cut or fade audio sources in and/or out (e.g., as in a live audio mixer). Further in this embodiment, a graphical representation of the video output is dynamically modified to visually reflect the audio editing. For example, a waveform is drawn over the linear representation of the output content to indicate the level of each audio source over the duration of the output content. In this embodiment, a waveform, color-coded to each audio source, indicates the level (e.g., volume) of the source throughout the video output.

Figure 16:
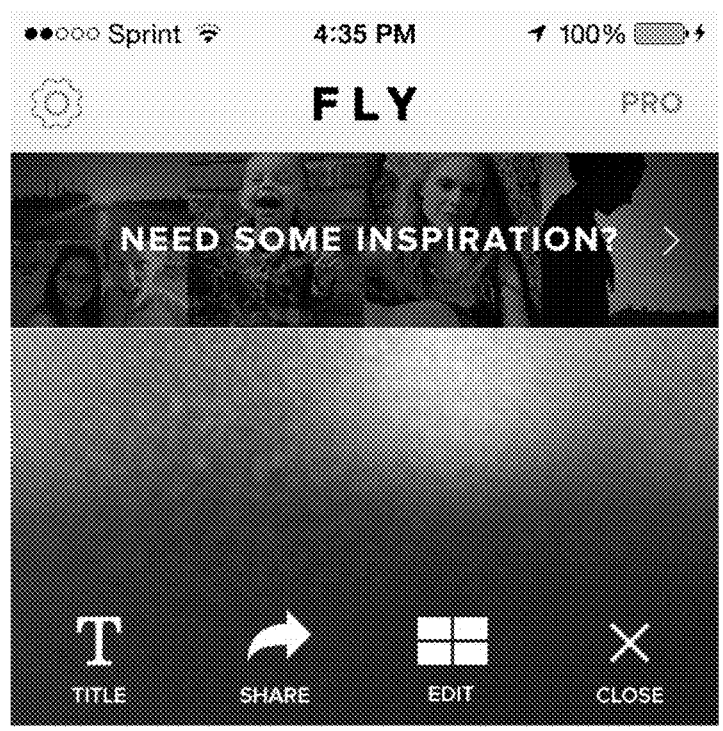
FIG. 16 shows a non-limiting example of a gesture-based, live video editing application; in this case, an application including an interface screen for allowing a user to optionally title, share (e.g., by email, instant message, social media, etc.), or edit videos created with the application.
Figure 16:
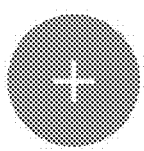

Referring to FIG. 16, in a particular exemplary embodiment, a user interface for a gesture-based video editing application includes further tools allowing the user to optionally save, title, share (e.g., by email, instant message, social media, etc.), and/or edit videos created with the application.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.
Digital Processing Device In some embodiments, the systems, methods, and media described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein. In some cases, the display is also a user input device.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-transitory Computer Readable Storage Medium

In some embodiments, the systems, methods, and media disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, methods, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity Mobile Application In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the systems, methods, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the systems, methods, and media disclosed herein include one or more databases, or use of the same. In view of the disclosure provided herein, those of skill in the art will recognize that many databases are suitable for storage and retrieval of user and video information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

A father has source videos representing multiple simultaneously-recorded angles of his daughter playing piano: one from the side of the keyboard capturing a close-up of the hands, one from the music stand capturing his daughter's facial expressions as she plays, and one from 15 feet away where the father was getting a wide-angle shot while holding a recording device from a couch. The father watches the videos play back simultaneously on an iPad® app that incorporates the subject matter described herein. He sometimes taps with one finger, sometimes with two or three, and sometimes swiping with one or two fingers, so as to make a final video of his daughter's performance at the household piano. The final video incorporates split-screen effects, picture-in-picture effects, dissolve transitions from one angle to another, jump-cut transitions and more, but maintains the continuous audio track of the video that had the best quality audio. The entire process is finished within 5 minutes of the end of the daughter's performance, because the editing is done while the videos play back in real-time or substantially in real-time. The video is less boring than home movies made without this invention because it incorporates different configurations and transitions.

Example 2

A college student is backpacking through the mountains when she is awe-struck at the view: stunning snow-capped mountain peaks in front of her, a pristine alpine lake to her left, a view of green spruce mountain-side forest to her right, but ominous vultures peering at her from a nearby tree. After capturing 30 seconds of each scene on her iPhone®, she makes a video while using a mobile editing application that incorporates the subject matter described herein. She swipes here and there as she watches the videos play back in synchrony, making sure to trigger soft, slow transitions between the peaks, the lake and the spruce forest using swipes, and once in a while causing harsh, instantaneous jump cut transition to the ominous vultures using taps, allowing her to create a video which expresses to her friends and family back home the way that she felt that day when she was backpacking: while she was pleasantly taking in the beauteous peaks, lake, and forest, letting her gaze gently sway from one scene to another, she was always nagged by the feeling that the vultures were watching her, and felt the need to shoot a quick glance over to them every once in a while to keep an eye on them. The mixture of dissolve transitions between the beautiful scenes and jump cuts to the vultures allows her to quickly express how she felt through a final edited video, which she can share to her social network.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. Non-transitory computer-readable storage media encoded with a computer program including instructions executable by a processor to perform operations to create a gestural video editing application, the operations comprising:

causing a plurality of video sources to be played simultaneously in a user interface;

detecting a gesture input from a user, the gesture input indicative of a selection of at least two video sources of the plurality of video sources, a transition between the at least two video sources, and one or more characteristics of the transition;

generating video output by combining the at least two video sources, applying the transition and one or more characteristics of the transition, wherein the video output includes the at least two video sources with the transition between the at least two video sources; and wherein detecting the gesture input comprises detecting a single-finger tap on a first video source in the user interface and a two-finger tap on a second video source in the user interface, and wherein generating the video output comprises combining the first video source and the second video source in a picture-in-picture configuration wherein the video output includes a simultaneous display of the first video source in a larger size with the second video source set inside the first video source.

2. The non-transitory computer-readable storage media of claim 1, wherein the transition is one of: a cut transition, a fade transition, a dissolve transition, a wipe transition, and a ripple transition.

3. The non-transitory computer-readable storage media of claim 1, wherein the gesture input further indicates a display configuration including one of: a full-screen configuration, a picture-in-picture configuration, and a split configuration.

4. The non-transitory computer-readable storage media of claim 1, wherein detecting the gesture input comprises detecting a single finger wipe from a first video source to a second video source of the at least two video sources, and wherein generating the video output comprises combining the first video source and the second video source in a full-screen configuration by applying a dissolve transition wherein the video output includes a gradual fade from the first video source to the second video source.

5. The non-transitory computer-readable storage media of claim 1, wherein the one or more characteristics are based on one or more of speed of the gesture input, length of the gesture input, and duration of the gesture input.

6. A computer-implemented method to generate a video output based on a plurality of video sources, the method comprising:
   causing the plurality of video sources to be played simultaneously in a user interface;
   detecting a gesture input from a user, the gesture input indicative of a selection of at least two video sources of the plurality of video sources, a transition between the at least two video sources, and one or more characteristics of the transition;
   generating the video output by combining the at least two video sources, applying the transition and one or more characteristics of the transition, wherein the video output includes the at least two video sources with the transition between the at least two video sources; and
   wherein detecting the gesture input comprises detecting a single-finger tap on a first video source in the user interface and a two-finger tap on a second video source in the user interface, and wherein generating the video output comprises combining the first video source and the second video source in a picture-in-picture configuration wherein the video output includes a simultaneous display of the first video source in a larger size with the second video source set inside the first video source.

7. The method of claim 6, wherein the transition is one of: a cut transition, a fade transition, a dissolve transition, a wipe transition, and a ripple transition.

8. The method of claim 6, wherein the gesture input further indicates a display configuration including one of: a full-screen configuration, a picture-in-picture configuration, and a split configuration.

9. The method of claim 6, wherein detecting the gesture input comprises detecting a single finger wipe from a first video source to a second video source of the at least two video sources, and wherein generating the video output comprises combining the first video source and the second video source in a full-screen configuration by applying a dissolve transition wherein the video output includes a gradual fade from the first video source to the second video source.

10. The method of claim 6, wherein the one or more characteristics are based on one or more of speed of the gesture input, length of the gesture input, and duration of the gesture input.

11. A system comprising:
   a digital processing device comprising an operating system configured to perform executable instructions and a memory device;
   a computer program including instructions executable by the digital processing device that cause the digital processing device to perform operations to create a gestural video editing application, the operations comprising:
   causing a plurality of video sources to be played simultaneously in a user interface;
   detecting a gesture input from a user, the gesture input indicative of a selection of at least two video sources of the plurality of video sources, an action to apply to the at least two video sources, and one or more characteristics of the action;
   generating video output by combining the at least two video sources, applying the action and one or more characteristics of the action, wherein the video output includes the at least two video sources with the action applied to the at least two video sources; and
   wherein detecting the gesture input comprises detecting a single-finger tap on a first video source in the user interface and a two-finer tap on a second video source in the user interface, and wherein generating the video output comprises combining the first video source and the second video source in a picture-in-picture, configuration wherein the video output includes a simultaneous display of the first video source in a larger size with the second video source set inside the first video source.

12. The system of claim 11, wherein the action includes a transition.

13. The system of claim 12, wherein the transition is one of: a cut transition, a fade transition, a dissolve transition, a wipe transition, and a ripple transition.

14. The system of claim 11, wherein the action includes an effect.

15. The system of claim 11, wherein the action comprises a display configuration including one of: a full-screen configuration, a picture-in-picture configuration, and a split configuration.

16. The system of claim 11, wherein detecting the gesture input comprises detecting a single finger wipe from a first video source to a second video source of the at least two video sources, and wherein generating the video output comprises combining the first video source and the second video source in a full-screen configuration by applying a dissolve transition wherein the video output includes a gradual fade from the first video source to the second video source.

17. The system of claim 11, wherein the one or more characteristics are based on one or more of speed of the gesture input, length of the gesture input, and duration of the gesture input.

* * * * *